United States Patent [19]

Dumontet et al.

[11] Patent Number: 4,705,480

[45] Date of Patent: Nov. 10, 1987

[54] ELECTRICAL CONNECTION DEVICE FOR A CONDUCTIVE BUSBAR COMPONENT INCLUDING AN EXPANSION JOINT

[75] Inventors: Max Dumontet, Pantin; Yves Pelletier, Cergy, both of France

[73] Assignee: Delachaux S.A., Gennevilliers, France

[21] Appl. No.: 838,740

[22] Filed: Mar. 11, 1986

[30] Foreign Application Priority Data

Mar. 11, 1985 [FR] France .................. 85 03526

[51] Int. Cl.⁴ .......................................... H01R 41/00
[52] U.S. Cl. .................................. 439/33; 191/29 R
[58] Field of Search ............... 339/9 R, 9 E, 256 RT;
191/29 R, 44, 44.1

[56] References Cited

U.S. PATENT DOCUMENTS 3,303,293 8/1964 Howell .................................. 191/23
3,892,299 7/1975 Kilburg ............................. 191/29 R
4,326,769 4/1982 Dorsey et al. ............ 339/256 RT X

FOREIGN PATENT DOCUMENTS 2807122 8/1979 Fed. Rep. of Germany .
3013111 10/1981 Fed. Rep. of Germany .... 191/29 R
2117337 2/1983 United Kingdom .

Primary Examiner—Eugene F. Desmond
Attorney, Agent, or Firm—Alan H. MacPherson; Thomas S. MacDonald; Richard Franklin

[57] ABSTRACT

The electrical connection device is constituted by a sliding system comprising at least one conductive pin (5) fixed on one rigid bar (2) and at least one associated pluggable connector (6) fixed on another rigid bar (2'), said sliding system simultaneously providing electrical continuity between said bars on either side of said expansion joint regardless of their relative longitudinal position, and mechanical guidance of said bars to keep them in alignment. Such a connection is particularly applicable to supplying power to handling devices such as cranes, travelling cranes, container transporters, etc.

12 Claims, 7 Drawing Figures

FIG_1

FIG_2

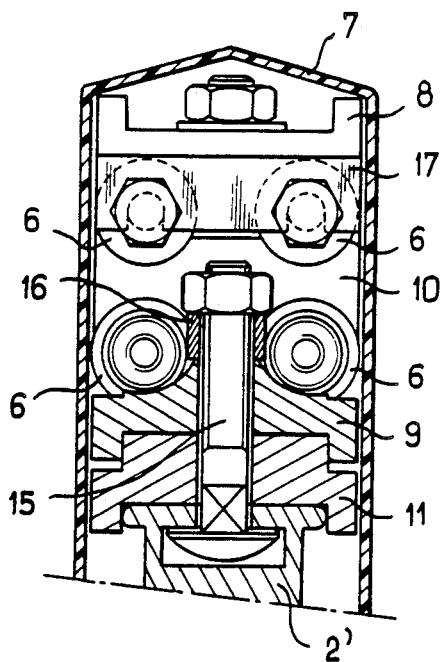
FIG_5
FIG_6
FIG_7

ELECTRICAL CONNECTION DEVICE FOR A CONDUCTIVE BUSBAR COMPONENT INCLUDING AN EXPANSION JOINT

The invention relates to conductor busbar components including expansion joints, in particular for supplying electricity to handling equipment. More particularly, the present invention relates to the electrical connection which ensures electrical continuity around an expansion joint.

The preferred application of the invention relates to contact rails which may be overhead or on the ground and which serve to supply power to equipment such as cranes, travelling cranes, container transporters, etc.

BACKGROUND OF THE INVENTION

In general, conductor busbars comprise rigid bars including a conductive path for guiding and for rubbing against a pickup shoe.

Expansion joints need to be provided in order to ensure both electrical continuity (for electrical pickup) and mechanical continuity (for guidance). Such expansion joints are provided at the free ends of two adjacent bars, which ends make contact with each other in order to ensure electrical pickup continuity regardless of their relative longitudinal position. This may be done by providing a notch in the side of the conductor bar up to the middle of its conductor track in order to have two half-bars overlapping each other side-by-side, or, better still, the free ends of adjacent bars may have complementary systems of interfitting plates in the form of two combs. As a result, each plate at the free end of a bar is in contact with one or two adjacent plates on the free end of the other bar in a central region of the expansion joint.

Such expansion joints pose both mechanical and electrical problems. The bars must be kept in alignment, and electrical continuity between the bars must be ensured in addition to ensuring electrical pickup continuity.

It is conventional to provide a mechanical guidance fitting on the side of the rigid bars which is opposite to the conductor track, which fitting interconnects the two adjacent bars on either side of the expansion joint in such a manner as to enable relative longitudinal sliding to take place therebetween while keeping said bars in alignment. The presence of such fittings is a drawback, particularly in relation to factory assembly time.

A flexible link cable or braid is conventionally used to provide electrical continuity between the bars. This has the advantage of simplicity, however when high currents are to be passed (e.g. 1,600 amps) this requires a flexible cable or braid of considerable size, which is incompatible with a compact installation. In addition, placing such flexible braids or cables on the sides of the bars, as is conventional, leads to additional safety precautions being necessary, in particular if the equipment is to operate out of doors in wet weather.

A first aim of the present invention is to provide a novel electrical connection device which is more reliable and which provides higher performance than existing devices, which novel device should be capable of withstanding high currents regardless of the relative longitudinal position of the adjacent bars on either side of an expansion joint.

Another aim of the invention is to maintain bar alignment in order to avoid the expansion joint being damaged when interfitting plates are used whose shoe-rubbing edges constitute extensions of the conductor paths over the entire length of the expansion joint.

Another aim of the invention is to simplify the design of conductor bars in order to reduce factory assembly time, thereby enabling very long bars to be made ready for fitting at a reasonable production cost.

SUMMARY OF THE INVENTION

The present invention provides an electrical connection device for a conductive busbar component including an expansion joint, said busbar component comprising rigid bars presenting a pickup shoe with a conductive path for mechanical guidance and electrical pickup, said expansion joint being constituted by the free ends of two adjacent bars coming into contact with each other in such a manner as to ensure continuity in guidance and in electrical pickup, said electrical connection device being constituted by a sliding system comprising at least one conductive pin fixed on one of said rigid bars and at least one associated pluggable connector fixed on the other one of said rigid bars, said sliding system simultaneously providing electrical continuity between said bars on either side of said expansion joint regardless of their relative longitudinal position, and mechanical guidance of said bars to keep them in alignment.

Preferably, said sliding system is disposed longitudinally on said rigid bars on the opposite side thereof to said conductive path for mechanical guidance and electrical pickup, thereby providing a very compact implementation which is easy to protect with a cover.

Advantageously, said sliding system comprises at least two conductive pins of round cross-section, with the free ends thereof being received in respective associated cylindrical pluggable connectors, and at least one of the free ends has an abutment member disposed at the tip thereof for limiting the maximum extension position of the expansion joint.

In order to have effective mechanical guidance without degrading electrical contact, each pluggable connector includes a bore with at least one ring for mechanically guiding the end of the associated pin, and at least one spring ring for providing electrical contact therewith.

Preferably, each conductive pin has a small cross-section at its free end for engaging the associated pluggable connector than at its other end, thereby enabling the maximum cross-section of said pin to be substantially the same as the inside diameter of the corresponding pluggable connector; this avoids assembly errors and makes it easier to stnadardize some of the component parts.

Advantageously, said sliding system is fixed to each of said rigid bars by means of an associated fishplate, with the length of said fishplates being chosen so that the area of contact between each fishplate and the corresponding rigid bar passes sufficient current regardless of the relative longitudinal position of said bars; each conductive pin is fixed to one of said rigid bars by means of jaws which are clamped against the associated fishplate by fastening members passing through said jaws and said fishplate, and the fastening members are mounted on the associated rigid bar in such a manner as to prevent the fastening members from rotating relative to the rigid bar.

In order to be able to work at high currents, in particular in the range of 1,000 to 1,600 amps, it is advantageous for said sliding system to include at least two conductive pins of round cross-section, with the free ends thereof being received in cylindrical associated pluggable connectors, and with said sliding system further comprising two adjacent rows of conductive pins, said pins being fixed to one of said rigid bars by means of jaws including a central jaw providing spacing between said adjacent rows; then, in order to provide optimum conductive pin fastening, said jaws should be clamped against the associated fishplate by fastening members passing through said jaws between the conductive pins of each row.

BRIEF DESCRIPTION OF THE DRAWINGS

An embodiment of the invention is described by way of example with reference to the accompanying drawings, in which:

FIG. 5 is a cross-section on V—V of FIG. 2 showing the sliding and the abutment means for the conductive pins;

FIG. 6 is a partial cross-section on VI—VI of FIG. 2 showing the plates at one end of a bar suitable for forming an interfitting system in an expansion joint with the plates on the end of the other bar; and FIG. 7 is a partial cross-section on VII—VII of FIG. 2, showing the above plates interfitting in the central region of the expansion joint.

DETAILED DESCRIPTION

Figure 1:
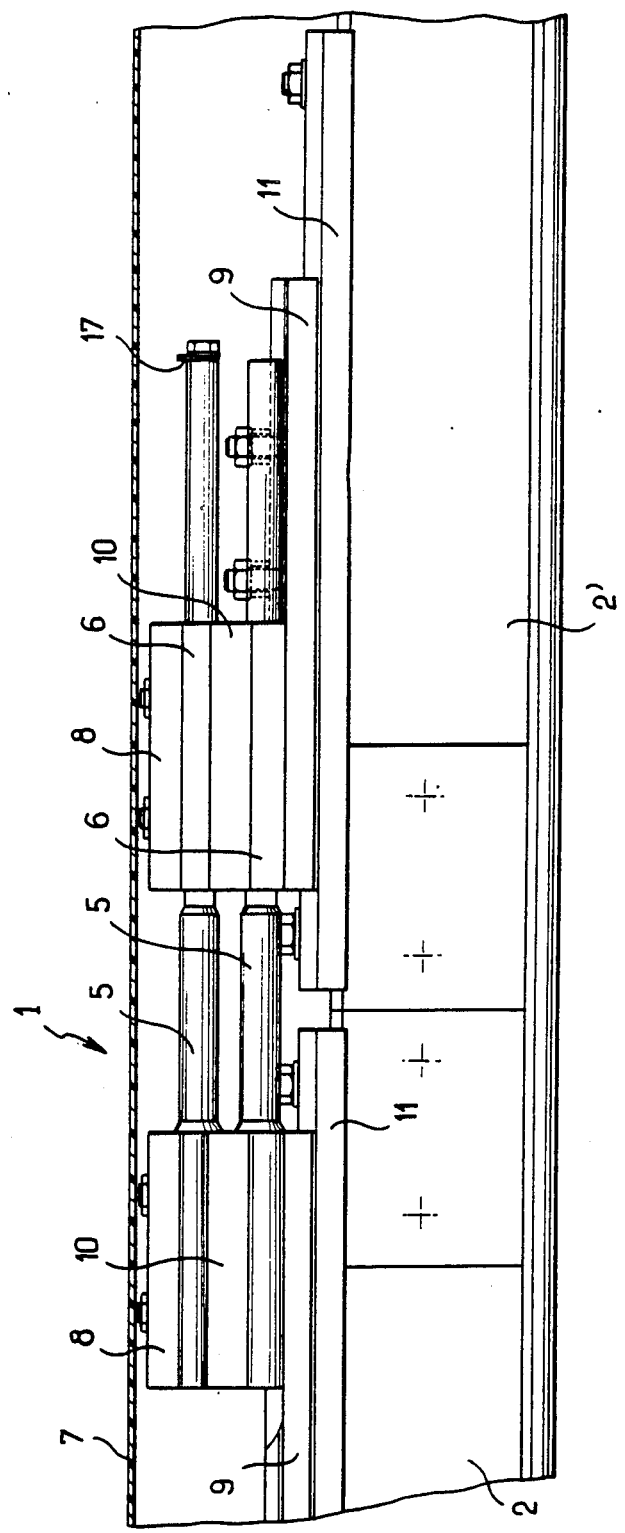
FIG. 1 is a plan view of a portion of a conductor bar component fitted with an electrical connection device in accordance with the invention, showing the expansion joint in its minimum spacing position.
Figure 2:
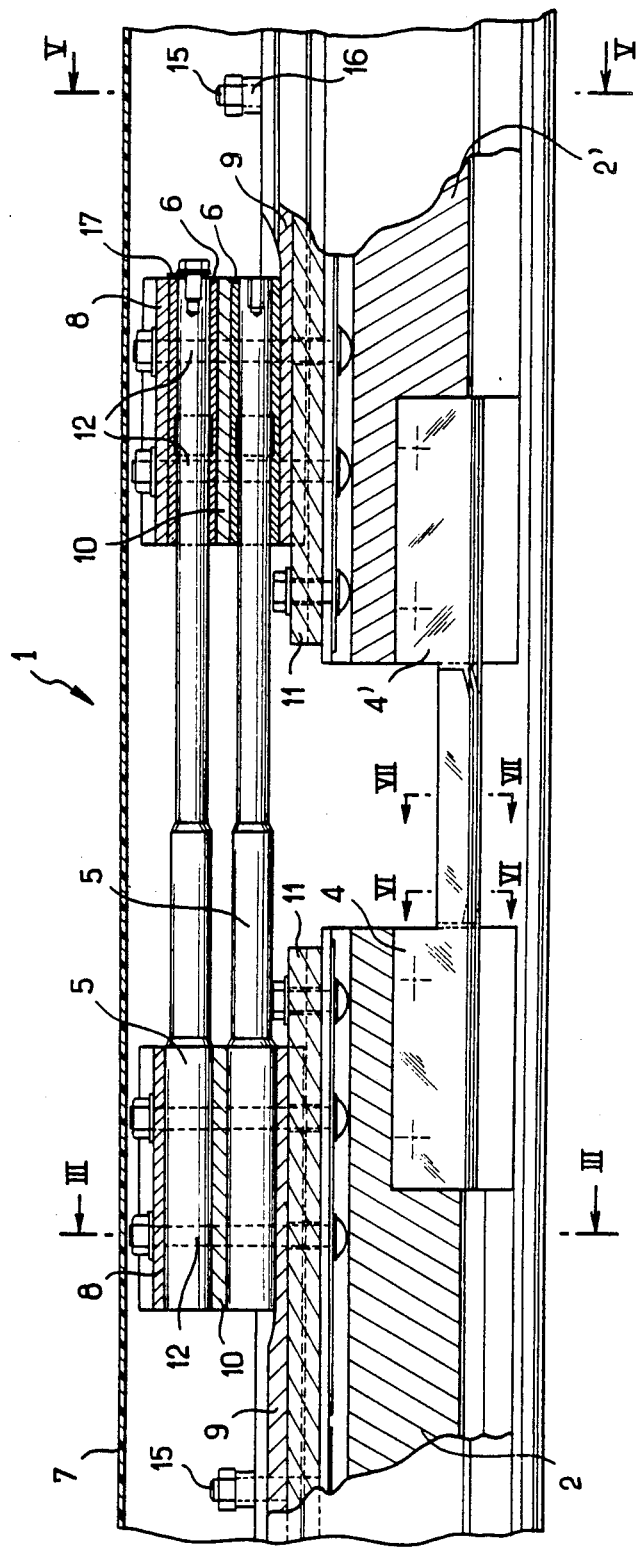
FIG. 2 is a longitudinal section through the FIG. 1 conductor bar component, with the expansion joint being shown in its maximum spacing position.

FIGS. 1 and 2 show a conductor bar component 1 having an expansion joint, the bar being of the type used to supply power to handling equipment (cranes, overhead cranes, container transporters, etc.). The conductor bar component 1 comprises rigid bars 2, 2', made of aluminum, for example, providing a conductive path 3 for guiding and for rubbing against a rubbing or friction pickup shoe (not shown), with the path being in the form of a concave V-shaped strip snap-fitted to the rigid bars (see FIG. 3).

The expansion joint between two adjacent bars is defined by a system of interfitting plates 4, 4'. Each set of plates is received, together with its spacers, in a housing provided at the end of the corresponding rigid bar, and is fixed thereto by bolts or rivets. FIGS. 6 and 7 show the interfitting system of plates, and in particular they show the V-shaped outline of the edges of the plates which engage a rubbing pickup shoe, in particular, these edges constitute a direct extension of the conductive paths 3 running over the entire length of the expansion joint. This configuration is highly advantageous, since there is no guidance discontinuity when passing over the expansion joint, and electrical pickup continuity is ensured with a high degree of reliability.

None of the plates is visible in FIG. 1 since the expansion joint is in its position of minimum spacing, whereas in FIG. 2 the expansion joint is in its maximum spacing configuration.

In order to avoid any risk of the system being damaged, it is necessary to keep the bars in alignment.

This is where the novelty of the invention lies, whereby an electrical connection device is provided which is essentially constituted by a sliding system including at least one conductive pin 5 fixed on one of the rigid bars 2 and an associated pluggable connector 6 fixed on the other rigid bar 2'. According to a fundamental aspect of the invention, this sliding system simultaneously provides both electrical continuity between the bars on either side of the expansion joint, regardless of their relative longitudinal position, and also mechanical guidance of said bars, while preserving their alignment.

In applications requiring only moderate currents (e.g. up to 630 amps), two conductive pins suffice. The variant illustrated in the drawings has four round cross-section conductive pins and is suitable for use with currents in the range 1,000 to 1,600 amps.

Figure 3:
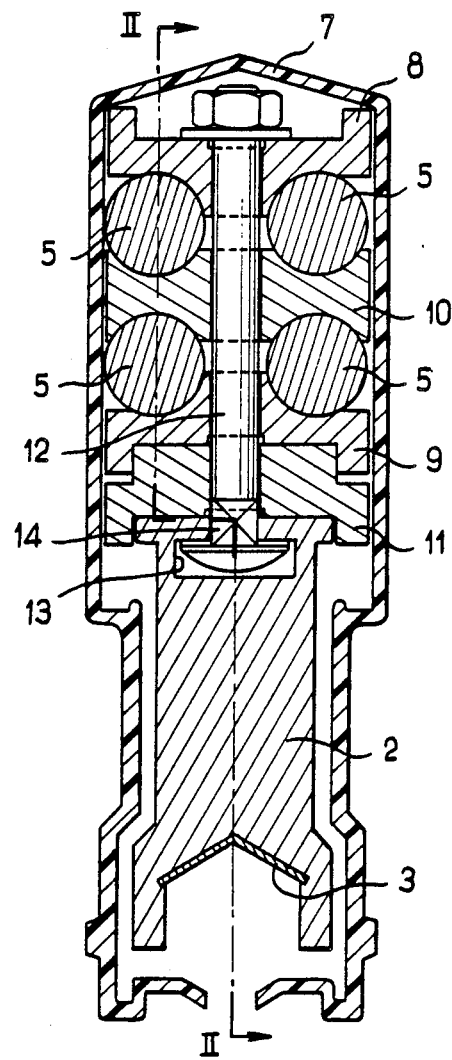
FIG. 3 is a cross-section on III—III of FIG. 2 showing how the conductor pins are fixed.

As can be seen more clearly from FIGS. 3 and 5, the sliding system is disposed longitudinally (in preference to being disposed on one side) and on the opposite side to the guidance and pickup track 3. The sliding system is organized as two adjacent rows, thereby providing a highly compact configuration which is readily protected by a cover 7.

Naturally, when a large number of conductive pins are used, bar component twisting is avoided and the clearance between the plates of the expansion joint is preserved. When only one conductive pin is used, it is preferable for it to be constituted by a bar of polygonal cross-section, e.g. of square cross-section, in order to improve resistance to twisting.

The conductive pins 5 are connected to the rigid bar 2 by means of upper and lower jaws 8 and 9 together with a central spacer jaw 10 (in this case because of the two adjacent rows of pins), with the jaws having a longitudinal shape suitable for receiving the pins. These details are most clearly visible in FIG. 3. This assembly bears against a fishplate 11 disposed against the rigid bar 2 and is held in place by bolts 12 whose heads are received in a groove 13 of the bar. The bolts are preferably coach bolts having square collars 14 to engage a facing edge of the bar, thereby preventing the bolts from rotating. Items 8 to 11 are made of the same materials as the rigid bars (e.g., aluminum) whereas the conductive pins are advantageously made of copper.

With one end of each conductive pin 5 firmly fixed to the rigid bar 2, the other end is allowed to slide in the associated pluggable connector 6.

It may be observed that the pins 5 are of smaller cross-section where it is engaged by the associated connector 6, and that the maximum cross-section of the pins preferably corresponds to the inside diameter of said connector. This not only makes it possible to avoid errors of pin direction during assembly, but it also makes a degree of standardization in the parts easier to achieve.

FIG. 5 shows the connection to the pluggable connectors 6 on the rigid bar 2', which can make use of the same jaws 8, 9 and 10 and the same intermediate fishplate 11 as are used for the conductive pins. The fishplate 11 is also bolted further along to the corresponding bar: the bolts 15 are analogous to the bolts 12 except that they are shorter (with a spacer 16 leaving room to pass the ends of the pins in the FIG. 1 closed position). An abutment plate 17 in the form of a two-arch bridge is also provided fixed at the end of one row of conductive pins: the maximum spacing position is thus limited by the plate 17 coming into abutment against the facing edge of the jaws 8 and 10 (see FIG. 2).

Figure 4:
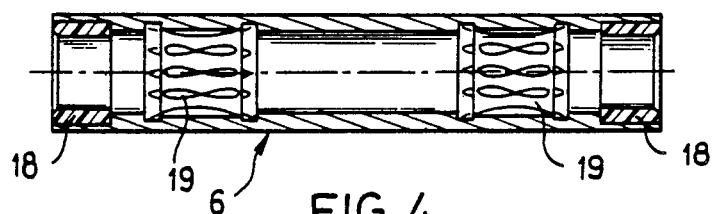
FIG. 4 is an axial section through a pluggable connector capable of receiving the end of a conductive pin.

FIG. 4 shows a pluggable connector 6 whose structure is advantageous for the present application. The bore of the connector has two end rings 18 for mechanically guiding the end of the associated pin, and at least one spring ring (19) for providing electrical contact. It is advantageous to separate the mechanical and electrical functions since contact rings such as 19, e.g. comprising contact springs suitable for providing good electrical contact, are not suitable for providing any kind of guidance, so mechanical guidance is ethylene, for example. In addition, the provision of such guide rings serves to avoid damage to the contact springs which might otherwise occur if the pin were to slide off-axis along the connector.

It should be observed that, in addition to providing good mechanical performance, the device also provides electrical performance which is sufficiently reliable to enable currents of up to 1,600 amps to be used. The fishplate 11 is provided with a length that is chosen in such a manner as to ensure that its contact area with the rigid bar is capable of passing sufficient current. Thus, when a pickup shoe passes over the expansion joint, two electrical paths are provided, thereby preventing the conductive pins from having to carry the entire current. Furthermore, in the event of a short circuit, the device is capable of withstanding the considerable electrodynamic forces which result from very high currents (15,000 to 20,000 amps, for example).

The invention is not limited to the above-described embodiments, but is applicable to any variant which may use equivalent means to fall within the scope of the accompanying claims.

We claim:

1. An electrical connection device for a conductive busbar component including an expansion joint, said busbar component comprising rigid bars presenting a pickup shoe with a conductive path for mechanical guidance and electrical pickup, said expansion joint being constituted by the free ends of two adjacent bars coming into interfitting with each other in such a manner as to ensure continuity in guidance and in electrical pickup, said electrical connection device being further constituted by a sliding system comprising at least one conductive pin fixed on one of said bars and at least one associated pluggable connector fixed on the other one of said rigid bars, said sliding system simultaneously providing electrical continuity between said bars on either side of said expansion joint regardless of their relative longitudinal position, and mechanical guidance of said bars to keep them in alignment.

2. An electrical connection device according to claim 1, wherein said sliding system is disposed longitudinally on said rigid bars on the opposite side thereof to said conductive path for mechanical guidance and electrical pickup.

3. An electrical connection device according to claim 1, wherein said sliding system comprises at least two conductive pins of round cross-section, with the free ends thereof being received in respective associated cylindrical pluggable connectors.

4. An electrical connection device for a conductive busbar component including an expansion joint as in claim 1 wherein said free ends of said adjacent bars have interdigitated conductive plates which are in sliding interfitting contact.

5. An electrical connection device according to claim 3, wherein at least one of the free ends has an abutment member disposed at the tip thereof for limiting the maximum extension position of the expansion joint.

6. An electrical connection device according to claim 1, wherein each pluggable connector includes a bore with at least one ring for mechanically guiding the end of the associated pin, and at least one spring ring for providing electrical contact therewith.

7. An electrical connection device according to any one of claims 3 to 6, wherein each conductive pin has a smaller cross-section at its end for engaging the associated pluggable connector than at its other end fixed on said rigid bar, thereby enabling the maximum cross-section of said pin to be substantially the same as the inside diameter of the corresponding pluggable connector.

8. An electrical connection device for a conductive busbar component including an expansion joint, said busbar component comprising rigid bars presenting a pickup shoe with a conductive path for mechanical guidance and electrical pickup, said expansion joint being constituted by the free ends of two adjacent bars coming into contact with each other in such a manner as to insure continuity and guidance and in electrical pickup, said electrical connection device being constituted by a sliding system comprising at least one conductive pin fixed on one of said rigid bars and at least one associated pluggable connector fixed on the other one of said rigid bars, said sliding system simultaneously providing electrical continuity between said bars on either side of said expansion joint regardless of their relative longitudinal position, and mechanical guidance of said bars to keep them in alignment, wherein said sliding system is fixed to each of said rigid bars by means of an associated fishplate, with the length of said fishplates being chosen so that the area of contact between each fishplate, and the corresponding rigid bar passes sufficient current regardless of the relative longitudinal position of said bars.

9. An electrical connection device according to claim 8, wherein each conductive pin is fixed to one of said rigid bars by means of jaws which are clamped against the associated fishplate by fastening members passing through said jaws and said fishplate.

10. An electrical connection device according to claim 9, wherein the fastening members are mounted on the associated rigid bar in such a manner as to prevent them from rotating relative thereto.

11. An electrical connection device according to claim 9, wherein said sliding system includes at least two conductive pins of round cross-section, with the free ends thereof being received in cylindrical associated pluggable connectors, and wherein said sliding system further comprises two adjacent rows of conductive pins, said pins being fixed to one of said rigid bars by means of jaws including a central jaw providing spacing between said adjacent rows.

12. An electrical connection device according to claim 11, wherein said jaws are clamped against the associated fishplate by fastening members passing through said jaws between the conductive pins of each row.

* * * * *